R. M. CLOUGH.
ANGLE IRON CUTTER.
APPLICATION FILED DEC. 24, 1913.

1,191,282.

Patented July 18, 1916.

WITNESSES:

INVENTOR.
Roger M. Clough:

BY

ATTORNEY.

UNITED STATES PATENT OFFICE.

ROGER M. CLOUGH, OF TOLLAND, CONNECTICUT.

ANGLE-IRON CUTTER.

1,191,282.　　　　　Specification of Letters Patent.　　Patented July 18, 1916.

Application filed December 24, 1913. Serial No. 808,584.

*To all whom it may concern:*

Be it known that I, ROGER M. CLOUGH, a citizen of the United States, and a resident of Tolland, in the county of Tolland and State of Connecticut, have invented certain new and useful Improvements in Angle-Iron Cutters, of which the following is a specification.

My invention relates to improvements in angle iron cutters, and the object of my improvement is simplicity and economy in construction, and convenience and efficiency in use.

Figure 1:
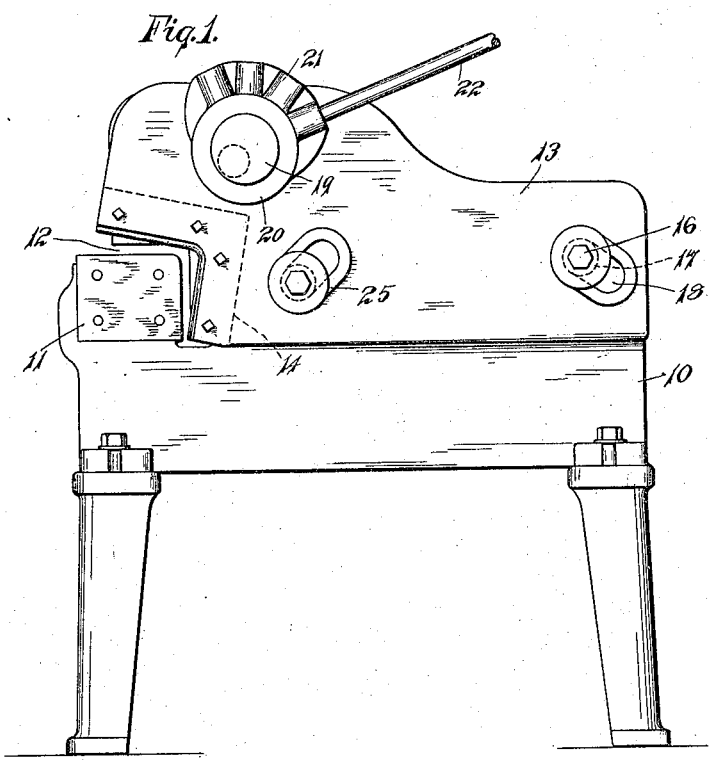
Figure 2:
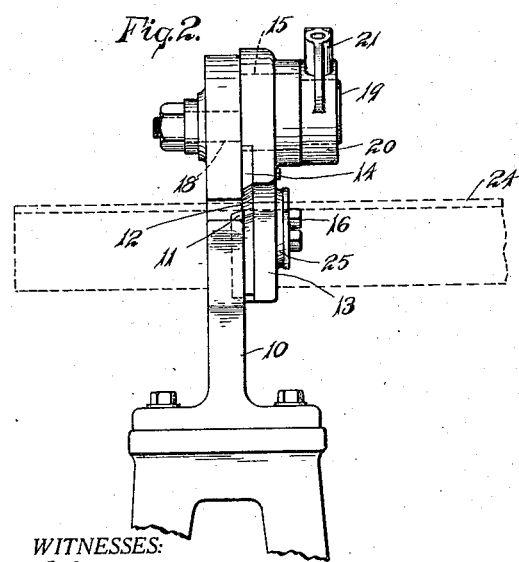

In the accompanying drawings, Figure 1 is a side elevation of my improved angle iron cutter; and Fig. 2 is a front elevation of the same.

My angle iron cutter comprises an elongated and generally horizontal frame 10 provided at the front end with means for receiving and supporting the lower cutting blade 11 and having a slot 12 extending around the upper and rear edges thereof, and a movable member or slide member 13 slidably mounted on one of the vertical side faces of the said frame 10 and provided with means for receiving and supporting the upper or mating cutting blade 14. The lower blade 11 is rectangular and is positioned in a vertical plane with the upper and rear edges exposed and serving as cutting edges, and which edges as shown are positioned respectively horizontal and vertical. The upper plate 14 is in the form of a right angle, having one part of the cutting edge generally vertical and the other part generally horizontal, to correspond to the vertical and horizontal cutting edges of the lower blade 11 with which they coöperate. Movement of the slide member 13 is effected by an eccentric member 15, which comprises a shaft portion 18 journaled in the frame 10 and an eccentric portion 19 engaged with a hub 20 on the slide member 13. A plurality of sockets 21 is provided extending radially along the upper periphery of the hub 20 for removably receiving an operating handle 22 in the form of a straight bar.

In the normal position, as shown in Fig. 1, the upper blade 14 is tilted relatively to the lower blade 11, with the cutting edges positioned at an angle one to the other, and the eccentric 19 is so positioned in the hub 20 that a complete movement thereof throughout the range prescribed, effects an essentially continuous forward movement of the hub 20 and also vertical movements thereof comprising initially, a slight upward movement which is continued up to what may be called a dead center, and then a downward or dropping movement. The upward and downward movement described correspond to the periods of engagement of the vertical cutting edges and the horizontal cutting edges consecutively.

At the rear end of the frame is a stud 16 carrying a roller 17 which moves in an angularly disposed slot 18 in the slide, which is inclined from the rear forwardly and upwardly. Consequently, as the slide member 13 is moved bodily forward in the manner described the rear end of the slide member is gradually tilted upwardly, resulting in a turning movement of the slide member and a shearing engagement of the cutting blades 11 and 14.

25 is a gib which guides the forward end of the slide in the movement imparted to it by the eccentric.

In the cutting operation the vertical cutting edges engage first with the vertical wall of the angle iron 24 and shear the same, and then the horizontal cutting edges engage with and shear the horizontal wall of the same.

My machine as described can of course be used for cutting ordinary bar iron as well as angle iron, and either the horizontal or the vertical cutting edges may be used. The forward movement of the slide brings the front corner of the movable cutter squarely above the front corner of the stationary cutter at the end of the slide movement, and by laying first one web of an angle iron at the end of the horizontal table of the stationary cutter, that web can be cut at any angle desired, and by reversing the position of the angle iron a notch can be cut in either web, or the two webs can be cut at any desired angle, permitting of shaping the ends of an angle iron so that two pieces may be fitted together in a corner, or bent to any shape desired. This is made possible by the use of a flat cutting table which permits of the angle iron being moved to various angular positions with respect to the cutting blades, and constitutes a feature of novelty and great advantage.

I am aware that this machine is susceptible of various changes or modifications, and of other uses than as an angle iron cutter.

I claim as my invention:

1. A metal shear comprising a fixed member having a cutting edge and a moving member having a coöperating cutting edge, means for imparting a movement of the said slide generally in one direction, and means serving to effect a tilting movement of the said slide comprising a stud secured to one of the said members, the other of the said members having a slot in which the said stud is positioned.

2. An angle iron shear comprising a fixed member having vertical and horizontal cutting edges, a slide having coöperating vertical and horizontal cutting edges, and means for imparting to said slide a longitudinal movement and a limited rocking movement in two directions relative to said fixed member to bring the cutting edges into operative relation.

3. An angle iron shear comprising a fixed member having vertical and horizontal cutting edges, a slide having coöperating vertical and horizontal cutting edges, an eccentric engaged with said slide for causing its bodily movement relative to said fixed member, and an angularly arranged guide to provide a tilting motion to said slide.

4. An angle iron cutter comprising a fixed member having vertical and horizontal cutting edges, a moving member having vertical and horizontal cutting edges, an eccentric member having a shaft portion journaled in said frame and an eccentric portion engaged with said moving member, and means for guiding the said moving member for effecting an angular movement of the said moving member relatively to the said fixed member.

5. An angle iron cutter comprising a frame having a cutting blade and a slide member having a cutting blade, an eccentric member operatively connecting said frame and slide member, a stud on said frame, and said slide member having a guide slot engaged with said stud.

6. An angle iron cutter comprising a fixed member and a moving member slidably mounted thereon, and an eccentric connecting said members and operative to impart a longitudinal movement to said moving member and also a rising and falling movement, cutting edges on said members that are operative during such rising movement, and other cutting edges on said members that are operative during such falling movement.

7. In combination in an angle iron cutter, a frame having a vertical face, a slide member mounted on said face, an eccentric member having a shaft portion journaled in said frame and an eccentric portion engaged with said slide member, a plurality of studs on said frame and extending laterally from said face, said slide member having slots engaged with said studs, a lower cutting blade mounted on said frame and an upper cutting blade mounted on said slide member, and one of said blades being rectangular and the other in the form of a right angle.

8. A metal shear comprising a frame and a slide mounted and movable both horizontally and vertically on said frame, coöperating vertically arranged cutting blades on said frame and slide, and coöperating horizontally arranged cutting blades on said frame and slide and means for moving the said slide in substantially one direction and bringing the said vertically arranged blades and horizontally arranged blades successively in operation.

ROGER M. CLOUGH.

Witnesses:
FRANK T. AMCOMB,
I. TILDEN JEWETT.

Copies of this patent may be obtained for five cents each, by addressing the "Commissioner of Patents, Washington, D. C."